United States Patent [19]
Dion

[11] Patent Number: 6,068,279
[45] Date of Patent: May 30, 2000

[54] TWO WHEEL DRIVE BICYCLE

[76] Inventor: Alan Dion, 320 Rochelle Ave., Philadelphia, Pa. 19128

[21] Appl. No.: 09/073,609

[22] Filed: May 6, 1998

[51] Int. Cl.[7] ..................................................... B62M 1/02
[52] U.S. Cl. ............................................................. 280/261
[58] Field of Search ............................. 280/214, 259–262

[56] References Cited

U.S. PATENT DOCUMENTS

| | | |
|---|---|---|
| 3,193,305 | 7/1965 | Hendricks . |
| 4,479,660 | 10/1984 | Pattison .................... 280/261 |
| 4,773,662 | 9/1988 | Phillips . |
| 5,116,070 | 5/1992 | Becoat . |
| 5,158,314 | 10/1992 | Pinos . |
| 5,224,725 | 7/1993 | Erlston . |
| 5,253,889 | 10/1993 | Kaminski . |
| 5,324,057 | 6/1994 | Chartrand ................... 280/261 |

FOREIGN PATENT DOCUMENTS

| | | |
|---|---|---|
| 2240523 | 4/1989 | United Kingdom . |
| 9215478 | 9/1992 | WIPO . |

*Primary Examiner*—Christopher P. Schwartz
*Assistant Examiner*—C. T. Bartz
*Attorney, Agent, or Firm*—Londa and Traub LLP

[57] ABSTRACT

A two wheel drive bicycle has fixed rear wheel and a turnable front wheel, a chain ring rotatable by way of an external rotation force, and a bicycle frame comprising a top tube and a head tube. A front drive chain runs, in sequence, from the chain ring, about a chain tensioner, around a first pulley of a pulley system, around a freewheel of the front wheel, around a second pulley of the pulley system, and back to the chain ring. The pulley system is fixed adjacent the head tube. The chain tensioner is characterized by a retractable third pulley attached to a spring means, the spring means being biased in a direction away from the front freewheel.

5 Claims, 5 Drawing Sheets

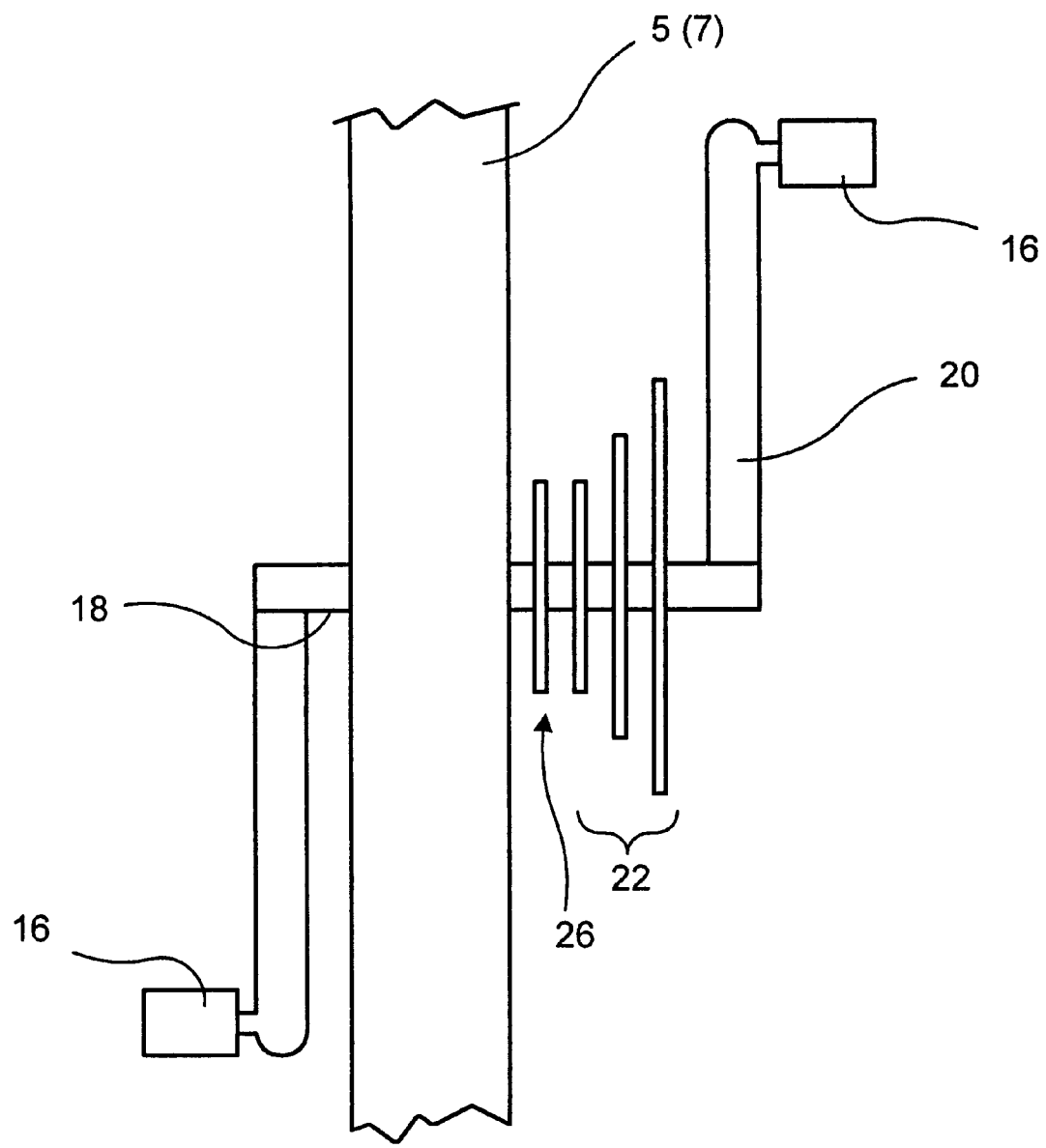
F I G. 5

TWO WHEEL DRIVE BICYCLE

BACKGROUND OF THE INVENTION

The present invention relates to a bicycle having a two wheel drive arrangement, in which both the front wheel and rear wheel are driven simultaneously and independently when the pedal crank is rotated.

When riding a bicycle on difficult terrain, it would be advantageous to have an independently driven front wheel, which could assist in providing a gripping force to compensate for any slip that may occur with the driven rear wheel. The advantages of all wheel drive are well known with respect to automobiles.

In designing a front wheel drive system, there are two principal challenges that are not present on a standard rear wheel only drive bicycle. These challenges arise from the fact that the front wheel of the bicycle must be free to turn. Thus, a system must be designed in which the chain driving the front wheel can operate without interfering with the turning of the front wheel. Furthermore, the presence of a chain system on the turning front wheel, results in a changing of the tension of the front wheel drive chain as the wheel is turned.

Thus, it is an object of the invention to provide a front wheel drive system in which the front wheel is free to turn without interference from the front wheel drive chain.

It is a further object of the invention to provide a front wheel drive system having a self-compensating means for maintaining a constant and proper tension on the front wheel drive chain as the front wheel is turned.

SUMMARY OF THE INVENTION

Accordingly, the present invention comprises a two wheel drive bicycle having a fixed rear wheel and a turnable front wheel, a chain ring rotatable by way of an external rotation force, and a bicycle frame comprising a top tube and a head tube. A front drive chain runs, in sequence, from the chain ring, about a chain tensioner, around a first pulley of a pulley system, around a freewheel of the front wheel, around a second pulley of the pulley system, and back to the chain ring. In order to avoid interference between the drive chain and the turning front wheel, the chain is brought through the pulley system which is fixed adjacent the head tube. This location of the pulley system acts to position the front drive chain away from the sweep of the rear portion of the front tire upon turning thereof. In order to maintain a constant tension of the front drive chain when the front wheel is turned, a chain tensioner is provided. The chain tensioner is characterized by a retractable third pulley attached to a spring means, the spring means being biased in a direction away from the front freewheel. Thus, as the tension of the front drive chain changes, the pulley moves either towards or away from the direction of the front freewheel, to thereby automatically tighten or slacken the chain in response to changing conditions.

BRIEF DESCRIPTION OF THE DRAWINGS

FIG. 5 shows a frontal schematic view of the crank arrangement.

DETAILED DESCRIPTION OF THE INVENTION

Figure 1:
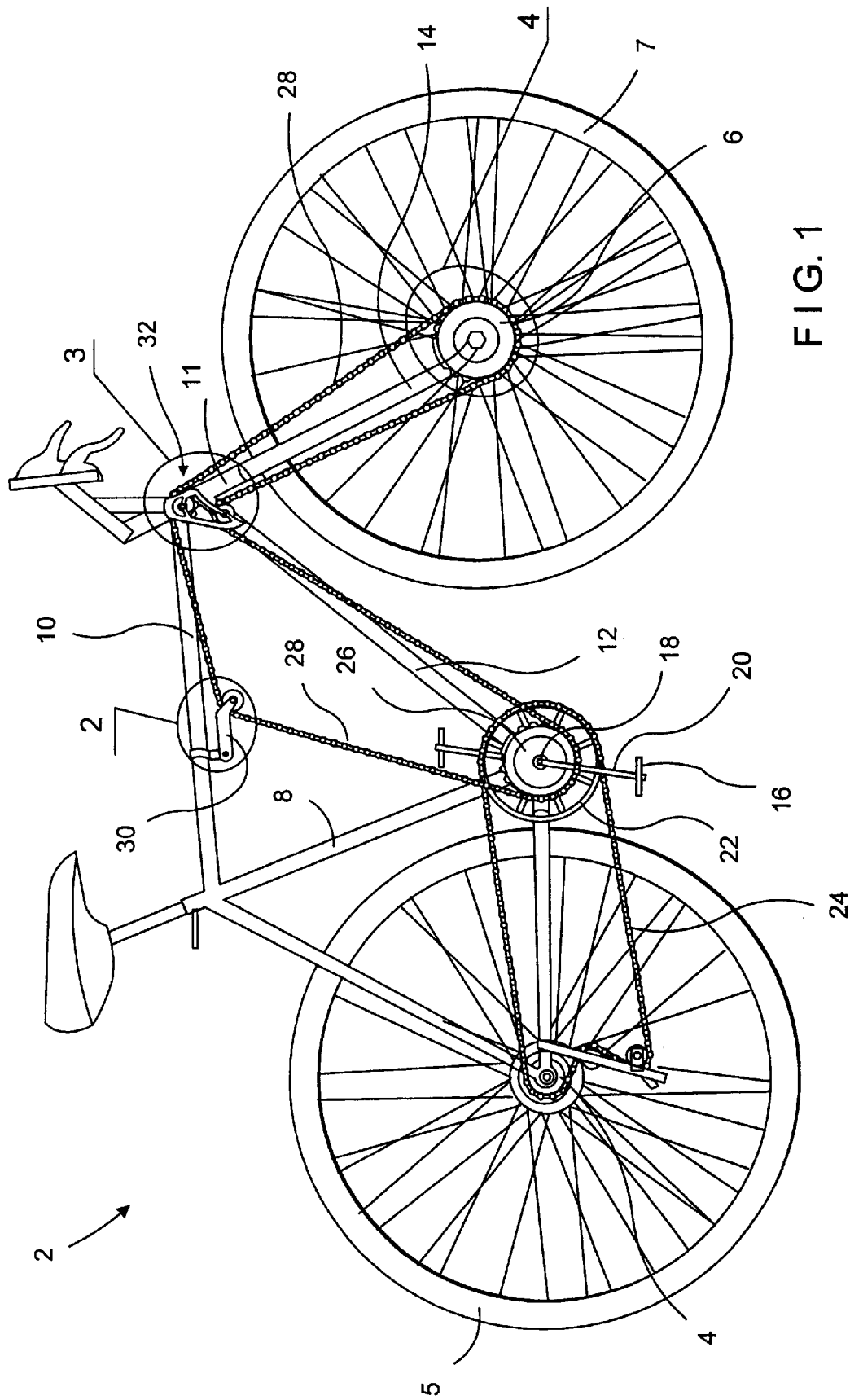
FIG. 1 shows a side plan view of the bicycle of the invention.

FIG. 1 shows a bicycle 2, having generally standard features as follows: a rear freewheel 4 on a rear wheel 5, front freewheel 6 on front wheel 7, frame 8 having a top tube 10, head tube 11, down tube 12 and front fork 14. With reference to FIG. 5, pedals 16 are used to rotate the crankshaft 18 via crank arms 20. A standard first series of co-axial gears or chain rings 22 of increasing diameters is present on the crankshaft for driving the rear freewheel 4 by way of a first, rear chain 24. Although three first chain rings 22 are shown, the series may comprise only one or any number of chain rings of varying diameters in the known fashion.

The invention further includes a second chain ring 26 residing on the crankshaft adjacent either the outermost or innermost of the first chain ring series 22, co-axial with the first chain ring series. The second chain ring 26 bears a second chain 28 for driving the front freewheel 6, in a manner described below. Although not shown, the second chain may comprise a set of freewheel sprockets on the front wheel of varying diameter and a derailleur to provide varying gear ratio availability to the front wheel.

Figure 3:
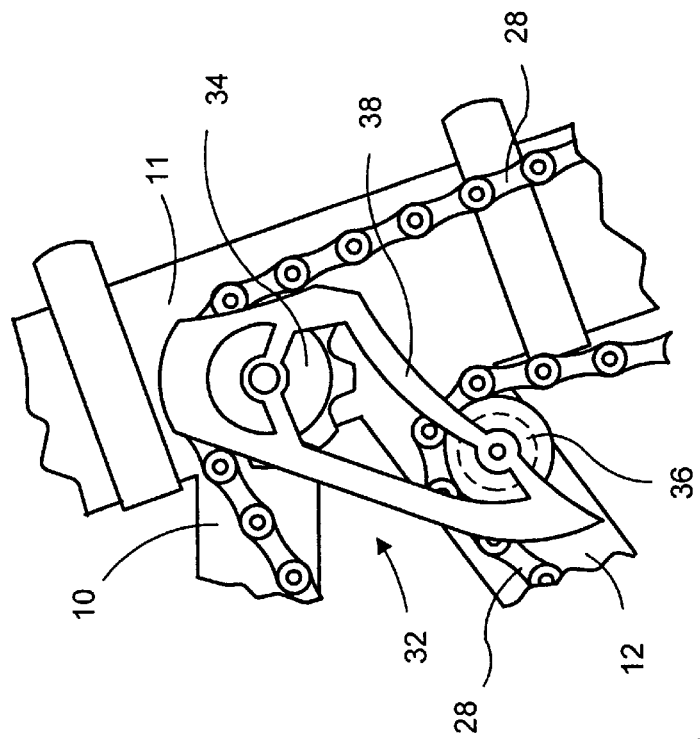
FIG. 3 shows a detail of FIG. 1, focusing on the pulley system arrangement.
Figure 4:
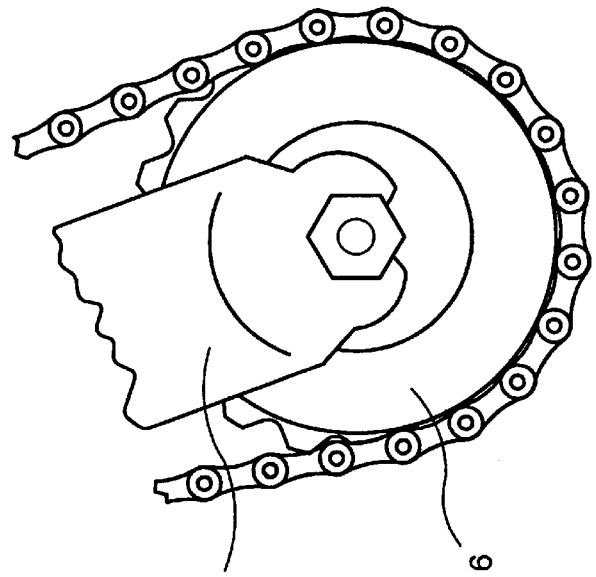
FIG. 4 shows a detail of FIG. 1, focusing on the front freewheel.
Figure 2:
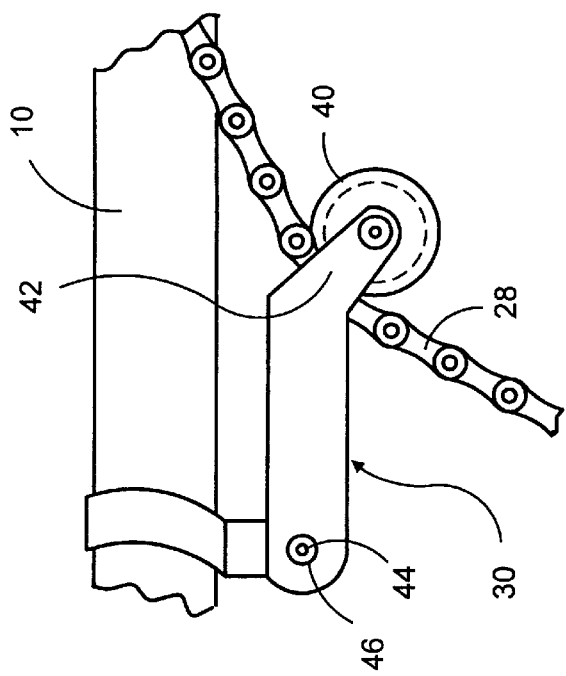
FIG. 2 shows a detail of FIG. 1, focusing on the chain tensioner arrangement.

With respect to FIGS. 2–4, the second chain 28 in the form of a continuous loop is wound through a chain tensioner 30 fixed to the top tube 10, then through a first pulley 34 of a pulley system 32 fixed to the head tube 11 at a point generally adjacent the intersection of the head tube 11, top tube 10 and down tube 12. The second chain 28 then travels in a direction generally downwardly along the front fork 14, wraps around the front freewheel 6, and returns upwardly along the front fork to a second pulley 36 of the pulley system 32. The first pulley 34 and second pulley 36 are preferably connected by a pulley cage 38. The second chain 28 winds about the second pulley and then rides downwardly, generally along the direction of the down tube 12 to its 'starting point' on the second chain ring. Thus, as the crankshaft is rotated by pedaling, the first chain ring drives the first chain to rotate the rear freewheel, and simultaneously the second chain ring drives the second chain to independently rotate the front freewheel and hence the front wheel.

The front chain must ride essentially on only one side of the bicycle frame. As a result, when the front wheel is turned from side to side about the axis of front fork, the tension of the front chain changes. Thus, when the wheel is turned to the right, the chain will slacken; when turned to the left, increased tension will be applied to the chain by way of the front freewheel. In order to maintain a relatively constant tension on the front chain, a chain tensioner 30 is provided.

As shown in detail in FIG. 2, the tensioner 30 is preferably positioned below the top tube, fixed thereto, in an intermediate position along the top tube. However, it should be seen that the tensioner may be fixed elsewhere on the frame, and may have a different construction, so long as the desired tensioning effect can be achieved. Thus, the tensioner may be any means for self-adjustingly applying tension to the chain in a direction generally away from the front freewheel, such as a gas spring or mechanical spring. In the example shown, the tensioner comprises a pulley 40 about which the second chain rides on its way to the front wheel. The pulley resides in a frame 42, which frame 42 comprises a spring 44, which frame 42 is pivotable with respect to the top tube at pivot point 46. The tensioner is biased, by way of spring 44, in a direction away from the front wheel. Thus, as the chain slackens during a right turn, the tensioner pivots towards the front wheel and pulls the chain tight; as the chain itself exerts a force during a left turn, the tensioner releases tension, allowing the pulley to move toward the front wheel. In this manner, a relatively constant and desired tension is maintained during turning operations of the bicycle. With respect to the tensioner, it should be seen that any acceptable biasing mechanism applied to the pulley 40 should be acceptable. For example, the pulley 40 may be biased by way of a spring means which moves linearly along an axis between the pulley 40 and the front wheel axis (as opposed to the rotationally acting tensioner shown in the preferred embodiment).

It should also be noted that the unique arrangement of the first and second pulleys adjacent the head tube, allows for the second chain to run essentially in a plane parallel to the frame of the bicycle, but without interfering with the turning of the front wheel. Of course, this problem does not arise with respect to the standard, fixed rear wheel.

It should be understood that, while the invention is described with respect to a two wheel drive system, the invention could be equally applied to a front wheel drive only system, in which the front wheel was the turning wheel. Furthermore, although the term bicycle is used throughout the specification and claims, this term is meant to encompass a tricycle, motorcycle, or any vehicle having a similar chain drive system.

Figure 6:
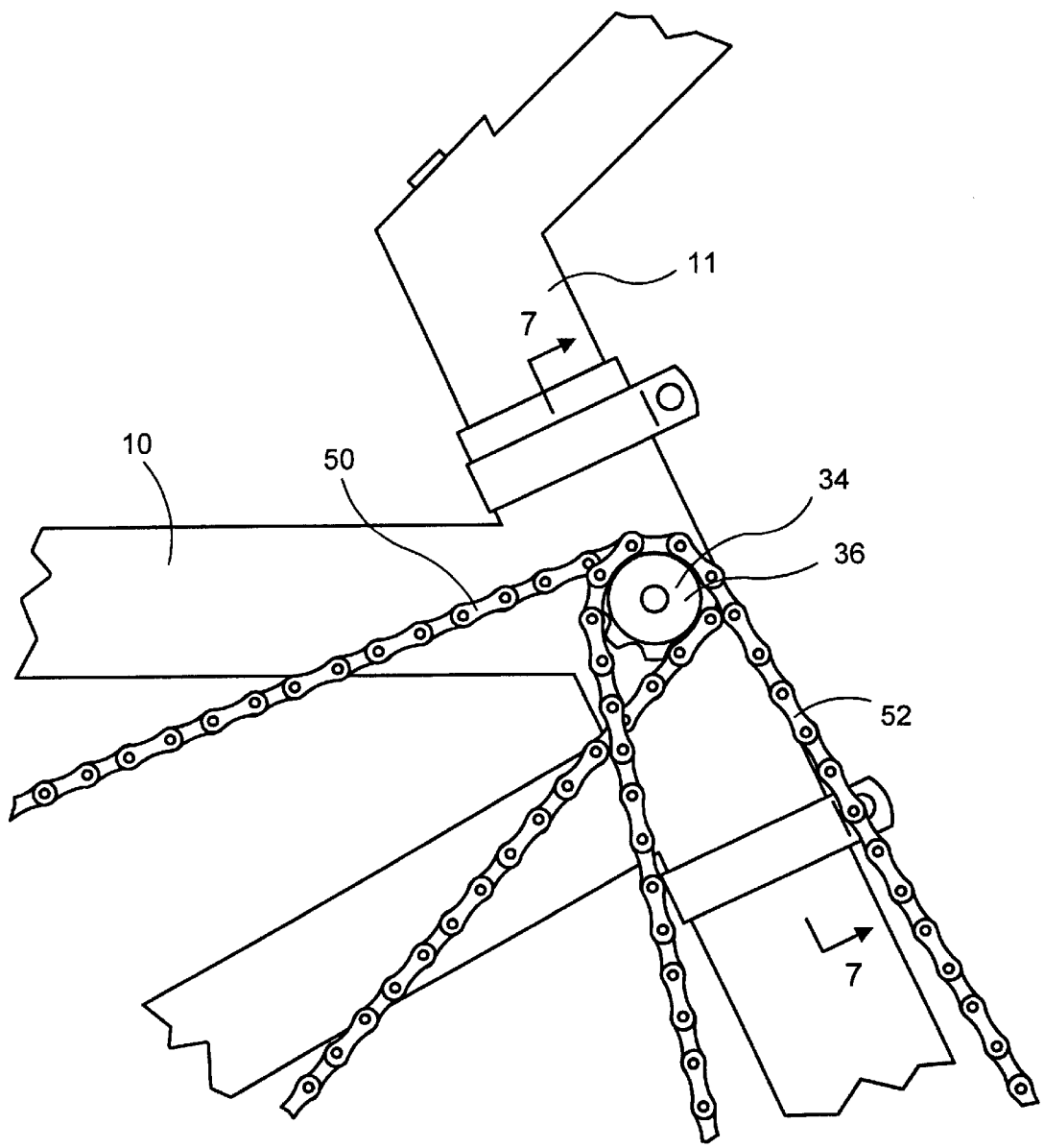
FIG. 6 shows a side schematic view of a two chain embodiment.
Figure 7:
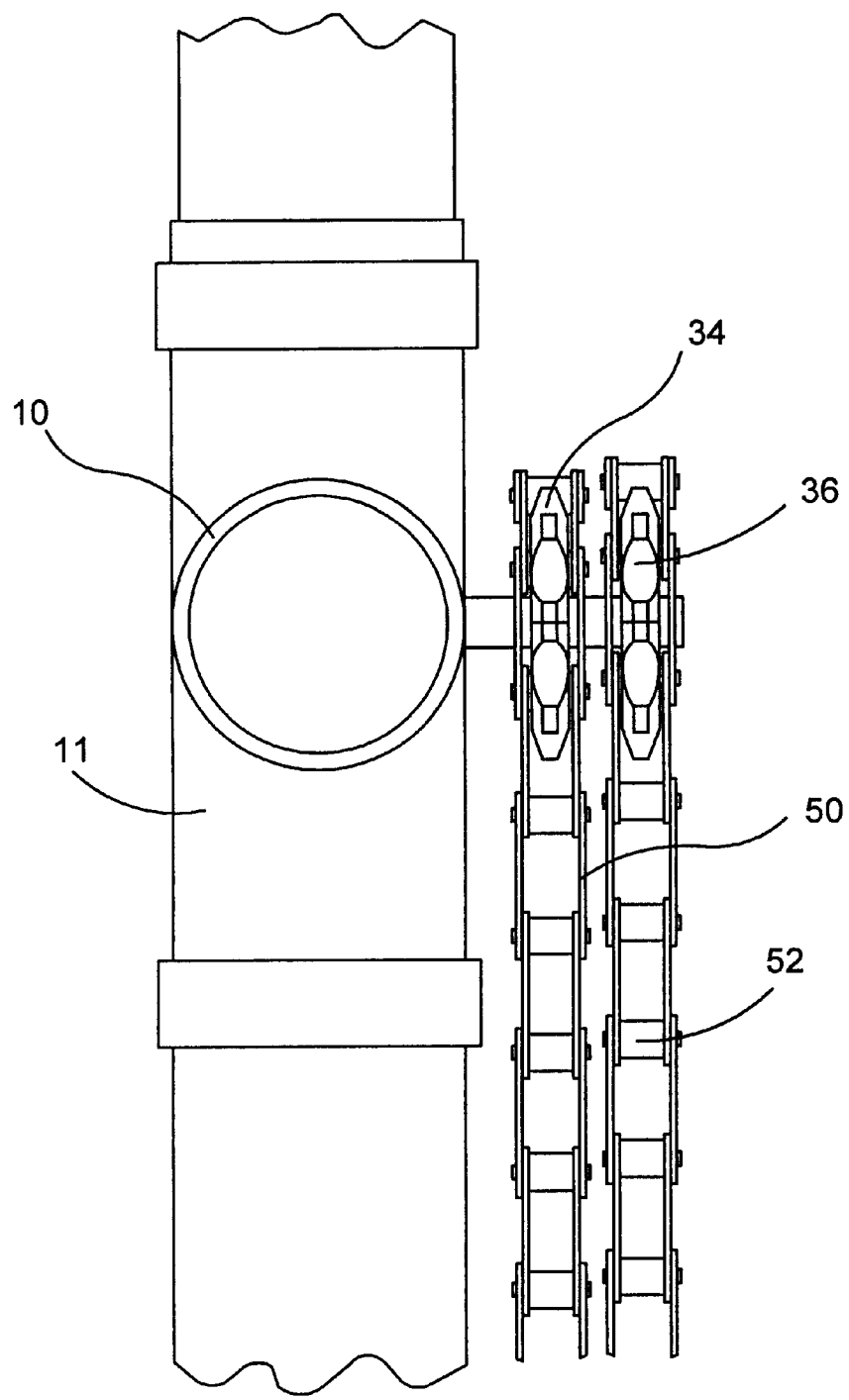
FIG. 7 shows a rear schematic view, taken along line VII—VII of FIG. 6.

A further variation on the system described above (FIGS. 6, 7) comprises two chains 50, 52 (third and fourth chains) in place of the single second chain. The first pulley and second pulley 34, 36 would be axially connected to each other, so that rotation of one caused rotation of the other. A third chain would run from the first pulley to the front freewheel and back around the first pulley. The fourth chain would run from the second pulley to the inner chain ring, around the tensioner, and back around the second pulley.

What is claimed is:

1. A bicycle, comprising:
    a fixed rear wheel and a turnable front wheel, a chain ring rotatable by way of an external rotation force, a bicycle frame comprising a top tube and a head tube,
    a drive chain running, in sequence, from the chain ring, about a chain tensioner fixed to the top tube, around a first pulley of a pulley system, around a freewheel of the front wheel, around a second pulley of the pulley system, and back to the chain ring,
    the pulley system being fixed adjacent the head tube,
    the chain tensioner comprising a retractable third pulley attached to a spring means, the spring means being biased in a direction away from the front freewheel,
    so as to maintain a generally constant tension on the drive chain.

2. The bicycle of claim 1, wherein the chain tensioner is fixed at a position such that third pulley is located at an intermediate position along a length of the top tube.

3. The bicycle of claim 1, wherein the chain tensioner comprises a pivot arm, the third pulley being rotatably fixed to a free end thereof, the spring acting on the pivot arm.

4. The bicycle of claim 1, wherein the first pulley and second pulley are axially fixed to each other, and the chain consists of two separate chains, a first chain running about the chain ring, the chain tensioner and the first pulley, and a second chain running about the second pulley and the front freewheel.

5. A bicycle, comprising:
    a fixed rear wheel and a turnable front wheel, a chain ring rotatable by way of an external rotation force, a bicycle frame comprising a top tube and a head tube,
    a drive chain running, in sequence, from the chain ring, about a chain tensioner, around a first pulley of a pulley system, around a freewheel of the front wheel, around a second pulley of the pulley system, and back to the chain ring,
    the pulley system being fixed adjacent the head tube,
    wherein the chain tensioner comprises a means for self-adjustingly applying tension to the drive chain in a direction generally away from the freewheel, so as to maintain a generally constant tension on the drive chain, and
    wherein the first pulley and second pulley are axially fixed to each other, and the chain consists of two separate chains, a first chain running about the chain ring, the chain tensioner and the first pulley, and a second chain running about the second pulley and the front freewheel.

* * * * *